United States Patent [19]
Dressel et al.

[11] Patent Number: 5,420,902
[45] Date of Patent: May 30, 1995

[54] FUEL ASSEMBLY WITH A FLOW-AIDING SPACER

[75] Inventors: Heinrich Dressel, Hessdorf; Stefan Linden, Erlangen; Hans-Joachim Lippert, Höchstadt; Werner Meier, Kunreuth; Roland Rink, Bad Königshofen, all of Germany

[73] Assignee: Siemens Aktiengesellschaft, Munich, Germany

[21] Appl. No.: 33,768

[22] Filed: Mar. 18, 1993

[30] Foreign Application Priority Data

Sep. 18, 1990 [DE] Germany .................... 40 29 539.7

[51] Int. Cl.⁶ .................................... G21C 3/34
[52] U.S. Cl. .................... 376/442; 376/439; 376/444; 376/462
[58] Field of Search ............... 376/441, 442, 462, 444, 376/439; 976/DIG. 80, DIG. 60

[56] References Cited

U.S. PATENT DOCUMENTS

| | | | |
|---|---|---|---|
| 3,380,890 | 4/1968 | Glandin et al. | 376/441 |
| 3,746,617 | 7/1973 | Iwao et al. | 376/442 |
| 4,544,522 | 10/1985 | Curulla et al. | 376/441 |
| 4,597,937 | 7/1986 | Sakurai et al. | 376/441 |
| 4,675,154 | 6/1987 | Nelson et al. | 376/444 |
| 4,728,490 | 3/1988 | Taleyarkhan | 376/439 |
| 4,740,350 | 4/1988 | Taleyarkhan | 376/441 |
| 5,035,853 | 7/1991 | Lettau et al. | 376/441 |

Primary Examiner—Donald P. Walsh
Assistant Examiner—Meena Chelliah
Attorney, Agent, or Firm—Herbert L. Lerner; Laurence A. Greenberg

[57] ABSTRACT

A fuel assembly includes a cluster of mutually parallel fuel rods. A fuel assembly channel laterally surrounds the cluster of fuel rods and has a substantially rectangular cross section and flat channel walls. Grid-like spacers having meshes formed therein each receive a respective one of the fuel rods for guiding the fuel rods in a plurality of axial positions. At least one support spring laterally supports each respective one of the fuel rods in the mesh guiding the fuel rod. Each of the spacers have inner ribs being aligned parallel to the fuel rods and outer peripheral ribs opposite the channel walls. At least some of the inner ribs are fastened to the peripheral ribs, and the outer peripheral ribs are joined together only by the inner ribs.

12 Claims, 9 Drawing Sheets

FUEL ASSEMBLY WITH A FLOW-AIDING SPACER

CROSS-REFERENCE TO RELATED APPLICATION

This application is a continuation of International application Ser. No. PCT/DE91/00733, filed Sep. 17, 1991.

SPECIFICATION

The invention relates to a fuel assembly having a bundle or cluster of mutually parallel fuel rods each being guided at a plurality of axial positions by a mesh, or mesh opening, of a grid-like spacer and being laterally supported there by a support spring.

Fuel assemblies contain a cluster of fuel rods that are parallel to one another and in boiling water reactors they are disposed around a coolant pipe, which typically has a rectangular cross section with flat pipe walls. The cluster is covered at the top and bottom by a plate having openings for the passage of coolant flowing from bottom to top, and in the case of a boiling water reactor is surrounded laterally by a fuel assembly channel, which typically has a rectangular cross section and practically flat channel walls. The lateral spacing of the fuel elements in the cluster is fixed at a plurality of axial positions of the fuel rods by grid-like spacers. Each fuel rod is guided through a mesh of the grid and is laterally supported there by a support spring.

Such a spacer is formed by ribs extending transversely to the rods and being aligned parallel to the rods. It is surrounded on the outside by outer peripheral ribs and on the inside, in the case of a boiling water reactor having a central coolant pipe, by inner peripheral ribs. The ribs may be rectilinear and may penetrate one another, producing polygonal grid meshes. However, they may also be constructed as tubes in particular, which are welded together and annularly surround the fuel rods. The ribs typically have tabs on their upper edge, which serve as flow guide surfaces and in particular in the case of the peripheral ribs, face into interstices between adjacent fuel rods. In pressure water reactors, the axial position of the spacers is dictated by fastening them to guide tubes, while in boiling water reactors having coolant pipes, the spacers may be held on the coolant pipe by stops secured to the pipe walls. The stops abut against the upper and lower edges of both the inner peripheral ribs and adjacent inner ribs, to provide an adequate stop surface area.

The inner ribs that extend between the fuel rods form bearing surfaces in each mesh for at least one support spring which presses the fuel rod against other retaining elements, such as rigid knobs. For the coolant flowing from bottom to top between the fuel rods, the ribs, knobs and springs present undesirable hindrances that prevent a uniform flow. In order to provide the best possible utilization of the existing cross section, an attempt is made in boiling water reactors to put the fuel rods as close as possible to the coolant pipe or fuel assembly channel. Then, however, the peripheral ribs form further flow hindrances. For the sake of good fuel utilization, an attempt is also made to distribute the fuel to as many fuel rods as possible, so that the rods are therefore made thin. That means that the interstices between the fuel rods are small as well, and therefore the structural elements of the spacer, which cannot be made arbitrarily thin because of the required mechanical strength, have an increasingly disruptive influence on the coolant flow. If a change is made from clusters with eight or nine rows and columns of fuel rods to configurations with 11 rows of fuel rods in the same fuel assembly cross section, for example, then care must be taken to provide a lower flow resistance by means of a suitably flow-aiding or streamlined construction of the spacer, if the necessary coolant throughput is to be maintained.

It is accordingly an object of the invention to provide a fuel assembly with a flow-aiding spacer, which overcomes the hereinafore-mentioned disadvantages of the heretofore-known devices of this general type and which has an adequately low flow resistance.

With the foregoing and other objects in view there is provided, in accordance with the invention, a fuel assembly, comprising a cluster of mutually parallel fuel rods; a fuel assembly channel laterally surrounding the cluster of fuel rods and having a substantially rectangular cross section and flat channel walls; grid-like spacers having meshes formed therein each receiving a respective one of the fuel rods for guiding the fuel rods in a plurality of axial positions; at least one support spring laterally supporting each respective one of the fuel rods in the mesh guiding the fuel rod; each of the spacers having inner ribs being aligned parallel to the fuel rods and outer peripheral ribs opposite the channel walls, at least some of the inner ribs being fastened to the peripheral ribs, and the outer peripheral ribs being joined together only by the inner ribs.

With the objects of the invention in view, there is also provided a fuel assembly for a boiling water reactor, comprising an approximately central coolant pipe; a cluster of mutually parallel fuel rods surrounding the coolant pipe and defining interstices therebetween; a channel laterally surrounding the cluster of fuel rods and having walls; a grid-like spacer having meshes for guiding the fuel rods, outer peripheral ribs opposite the walls of the channel, inner peripheral ribs substantially resting on the coolant pipe, and inner ribs joining the outer ribs to the inner peripheral ribs, the outer peripheral ribs and the inner peripheral ribs having upper edges; and support springs laterally supporting the fuel rods in the meshes, the support springs being rings of tabs disposed on the respective upper edges of the outer peripheral ribs and the inner peripheral ribs and bent into the interstices, all of the tabs having upper edges disposed in an upper plane, all of the ribs having lower edges disposed in a lower plane, and the outer peripheral ribs being lower than the inner peripheral ribs between the tabs.

In pressurized water reactors, the corners of the spacer must be spaced in such a way that the spacers of adjacent fuel assemblies are prevented as much as possible from catching on one another during maneuvers in the reactor. In boiling water reactors, it is difficult to assure that the corner rods will be adequately bathed with coolant. The invention therefore proposes (particularly for boiling water reactors) spacers with "open corners". In other words, the outer ribs do not directly meet one another at the corners. Instead, according to the invention, they are joined together only through inner ribs, so that a gap is created in the boundary formed by the outer ribs.

In order to attain this object, the invention also takes its point of departure from the flow resistance presented by the support springs and proposes one support spring for each mesh guiding a fuel rod. The support spring has an upper and a lower bearing surface that rests on a front side facing toward the rod, of a rib surrounding the applicable mesh.

These two bearing surfaces are joined to two flat legs, each adjoining a bearing surface, through a resilient middle part that is bent a single time and faces toward the fuel rod. These bearing surfaces each merge into one end of the spring and are fastened to one another in such a way that they encompass the rib. This brings about not only a first contact with the rib but also a long spring travel, which results in high elasticity and adequate contact force. In order to prevent over-stretching of the spring legs when the fuel rods are inserted and to prevent deformation of the bent middle part, the front side of the rib has a safety stop, in the form of a protrusion facing toward the resilient middle part.

Published European Application No. 0 330 013 A1, corresponding to U.S. Pat. No. 5,035,853, has already disclosed a spring with upper and lower bearing surfaces, a middle part joining the bearing surfaces through flat legs, and a safety stop, but there the middle piece between the flat legs has an undulating form with one or more arched portions, facing toward the front side of the rib. The arched portions can at the same time act as a safety stop. However, a singly bent muddle part according to the invention is substantially more flow-aiding or streamlined, and therefore the flow resistance at the protrusion facing toward the resilient middle part on the front side of the rib is virtually negligible.

It is normal for the outer ribs in boiling water reactors to be supported on the channel walls through knobs that are formed by two halves which are mirror images of one another and that are provided on each of the corners in rectangular fuel assemblies. In other words, each end of a rib adjacent to another rib at a corner has two such half-knobs, in the prior art. In contrast, the invention provides only one half-knob for each such rib end. In other words, the two halves of such a knob are separated from one another by a long, flat middle part of the rib. As a result, the flow resistance of the knobs is virtually halved, while the contact force is virtually unchanged.

In reactors (especially boiling water reactors) with spacers which have the aforementioned tabs on their tops, the size of the tabs is limited in a practical sense by the space between adjacent fuel rods into which the tabs are bent. That prevents limitations in terms of the geometry of the inner rib, since the spacer is held on the coolant pipe there. If the height of the remaining ribs is kept low, then the flow resistance is also correspondingly low. The invention provides for the outer peripheral ribs and the inner peripheral ribs to each extend with their lower edges down to a lower plane and with the upper edges of the tabs carried by the peripheral ribs extending up to an upper plane. However, between these tabs, the height of the outer peripheral ribs is less than the height of the inner peripheral ribs.

As a result, the tabs on the outer peripheral ribs are lengthened. In other words, their base is wider and the interstices between the tabs are correspondingly smaller than at the inner rib. There is accordingly still sufficient room between the tabs of the higher inner rib for the stops carried by the pipe walls to engage the tabs and come to a stop there, without requiring that the stops protrude so far into the interstice between the fuel rods that they also come to a stop at the inner ribs. In such a construction, it suffices to provide corresponding stops only in the middle of the pipe walls in each case. That lessens the flow resistance at the stops.

Particularly with rectangular coolant pipes, the corners formed by abutting peripheral ribs are weak points, mechanically. In particular, the tabs mounted there rip away all the more easily as they have to be made narrower, in view of the available space between the fuel rods. In this case the invention therefore provides that at least two adjacent tabs of the inner ribs (for instance, the corner tabs of abutting peripheral inner ribs) have locations at which they can be laterally welded to one another. This creates a reinforcement of the inner ribs (for instance, a reinforced corner).

Further problems arise because the inner peripheral ribs must be welded to inner ribs on one hand, but on the other hand they must offer space for accommodating spacer elements that support the inner ribs against the pipe walls. The invention provides for constructing upper and lower peripheral parts of the inner rib as contact parts, which spring back toward the fuel rods (that is, they point away from the pipe wall), and onto which a tubular or can-like inner rib forming the mesh of an adjacent fuel rod is welded or fastened on in some other suitable way. Between the upper and lower peripheral parts, a middle part of the peripheral rib is provided, on which a spacer element that supports the peripheral rib against the pipe wall is disposed. In particular, this spacer element may be a spring. The spacer elements are advantageously each disposed between the stop in the middle of a pipe wall and the corners of the coolant pipe, so that four upper and four lower stops and eight spacer elements (springs) are sufficient.

Other features which are considered as characteristic for the invention are set forth in the appended claims.

Although the invention is illustrated and described herein as embodied in a fuel assembly with a flow-aiding spacer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
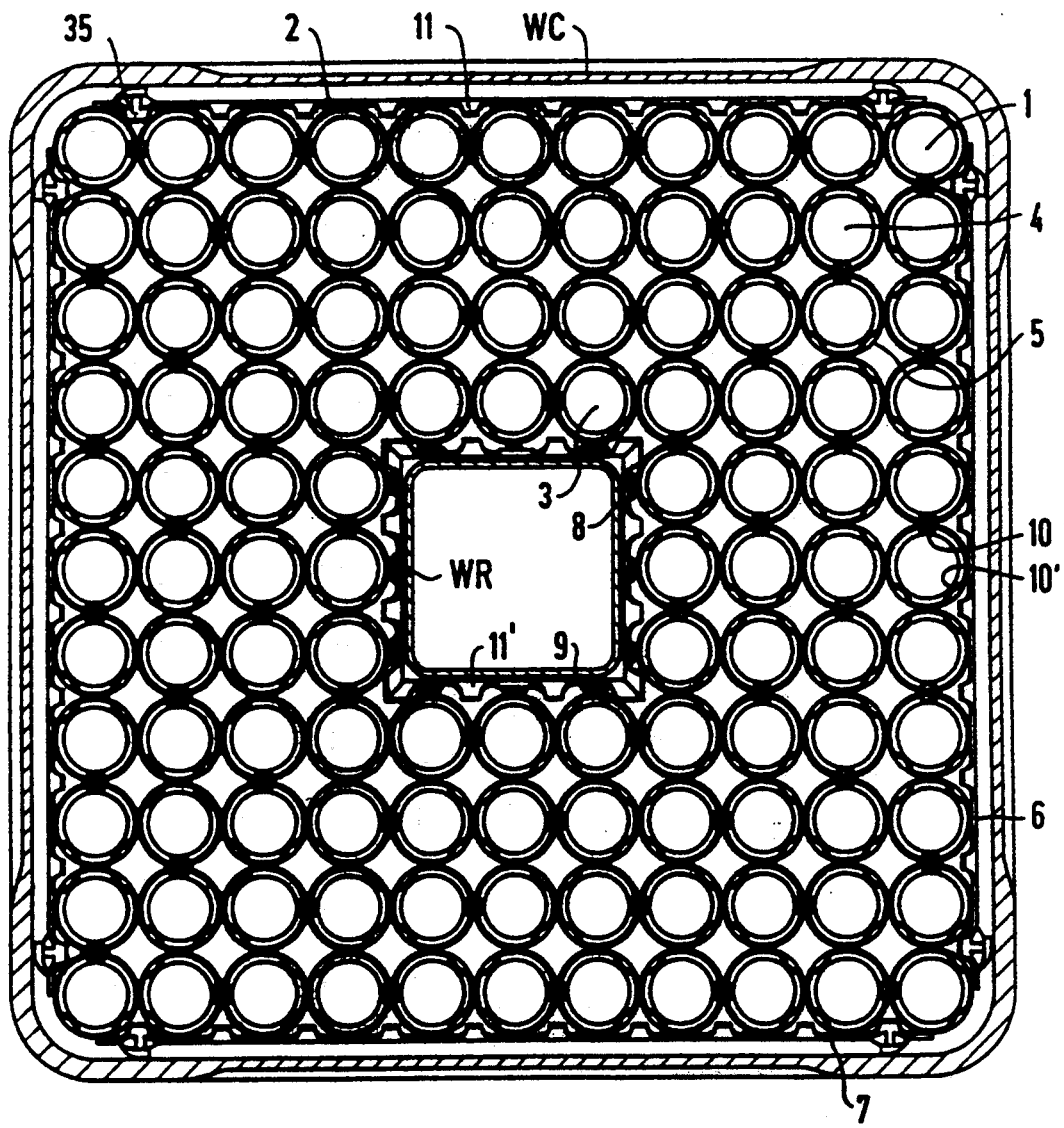
FIG. 1 is a diagrammatic, cross-sectional view of a preferred embodiment of the invention.

Referring now to the figures of the drawing in detail and first, particularly, to FIG. 1 thereof, there is seen a fuel assembly for a boiling water reactor in cross section, which includes 11 rows and columns of fuel rods. A rectangular fuel assembly cross section is assumed, and fuel rods located in corners ("corner rods") are shown at reference numeral 1, fuel rods ("peripheral rods") adjacent to a fuel assembly channel ("water channel" WC) are shown at reference numeral 2, fuel rods adjacent to a rectangular coolant pipe ("water pipe" WR) disposed in the center of a rod cluster or bundle are shown at reference numeral 3, and remaining "inner rods" are shown at reference numeral 4. A foot that closes off the channel WC and covers the cluster is located below the plane of the drawing and has flow openings through which water acting as a coolant and moderator is introduced into the fuel assembly from below. The water emerges again at corresponding flow openings from a plate in a fuel assembly head that covers the channel WC and the rod cluster above the plane of the drawing.

The fuel rods 1–4 are each guided by one mesh or opening of a grid-like spacer. These meshes, which define the spacer, in this preferred embodiment are formed by cans 5 that serve as inner ribs and surround the inner rods 4, the peripheral rods 2 and the corner rods 1. The cans 5 are laterally surrounded by outer peripheral ribs 6 and 7 and inner peripheral ribs 8 and 9.

At least one support spring 10 is disposed in each mesh for pressing the corresponding fuel rod against opposed knobs or bumps 10'.

The drawing also shows that the walls of the water channel WC have a normal thickness only at their corners and at the foot of the fuel assembly, while in middle parts the wall thickness is reduced. Under some circumstances, grooves or slight protrusions could be provided along the inner wall, acting as flow trippers. Otherwise, the channel walls are flat.

Tabs 11 and 11' are respectively disposed on the outer peripheral ribs 6 and 7 and on the inner peripheral ribs 8 and 9. The tabs begin at the upper edge of these ribs and are bent into interstices between peripheral ribs.

Figure 2:
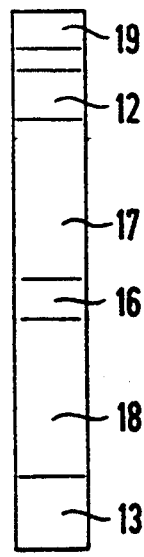
FIG. 2 is a plan view of a spring according to the invention.
Figure 3:
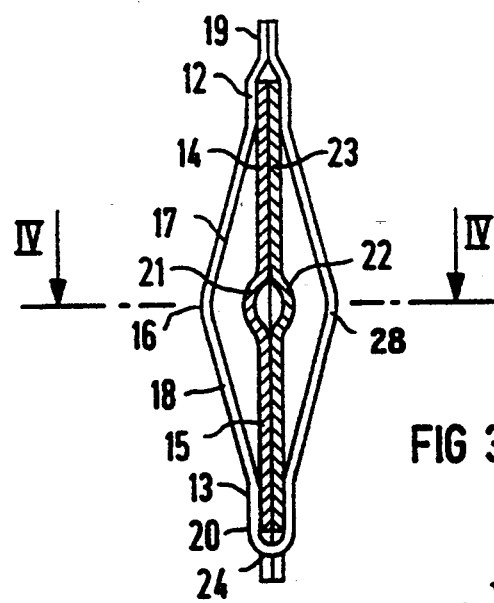
FIGS. 3 and 4 are respective longitudinal-sectional and fragmentary, cross-sectional views of a spring according to the invention and rib parts of the spacer of FIG. 1 which carry it, with FIG. 5 being taken along a line IV—IV of FIG. 3, in the direction of the arrows.

FIGS. 2 and 3 show that each of the support springs 10 which are each disposed in a respective one of the meshes guiding a fuel rod, has an upper bearing surface 12 and a lower bearing surface 13. According to FIG. 3, the bearing surfaces 12 and 13 rest on a front side 14 of a rib 15 surrounding the mesh. The front side 14 faces toward the rod. These bearing surfaces 12 and 13 are joined to two flat legs 17 and 18, each of which adjoins one bearing surface, through a singly bent, resilient middle part 16 facing toward the fuel rod.

The bearing surface 12 changes into a spring end 19, which advantageously protrudes beyond a contacting edge of the front side 14 of the rib 15. A corresponding spring end 20 on the bearing surface 13 is advantageously bent around a contacting edge of the rib 15 and extends on the back side of the rib 15 as far the spring end 19, where these two spring ends are joined to one another.

Since the two spring ends are fastened together, the rib 15 is enclosed by the spring. Therefore, the spring cannot fall off. On the back side of the rib 15 facing away from the rod, the two spring ends encompassing the rod may form a spring part 28 ("double spring") that is mirror-symmetrical to the bearing surfaces 12 and 13 and the singly bent middle part 16.

The front side 14 also has a protrusion 21 pointing to the bent middle part 16, and if the spring is constructed with mirror symmetry, then a protrusion 22 pointing to the mirror-image spring part 28 is also provided on the back side.

Figure 4:
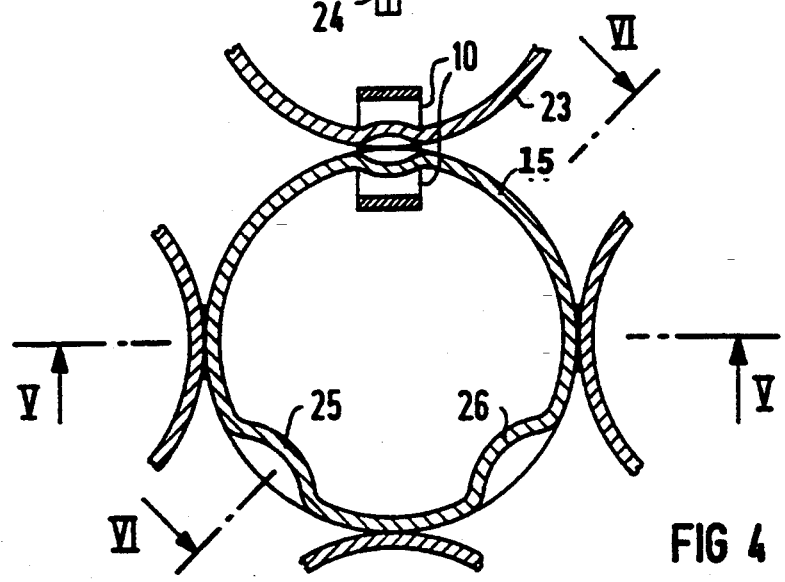

As FIG. 4 shows, the spring 10 may encompass two cans that are fastened together and form the meshes of two adjacent fuel rods. Accordingly, a further inner rib 23, which is also enclosed by the spring and on which the adjacent rod is supported, rests on the inner rib 15.

Figure 5:
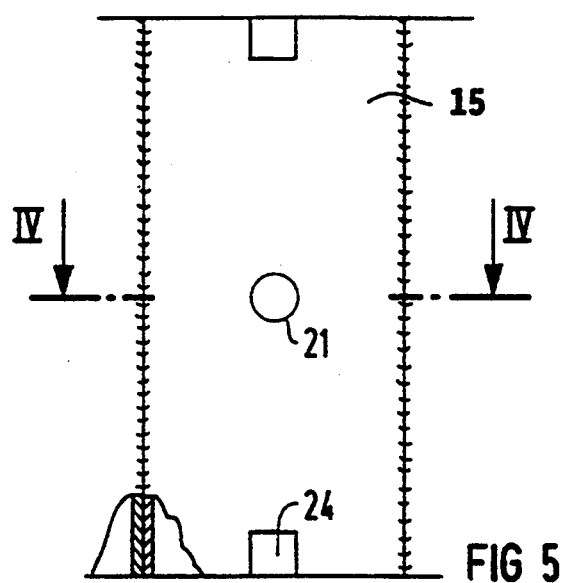
FIGS. 5 is a partly broken-away sectional view taken along a line V—V of FIG. 4, in the direction of the arrows.
Figure 6:
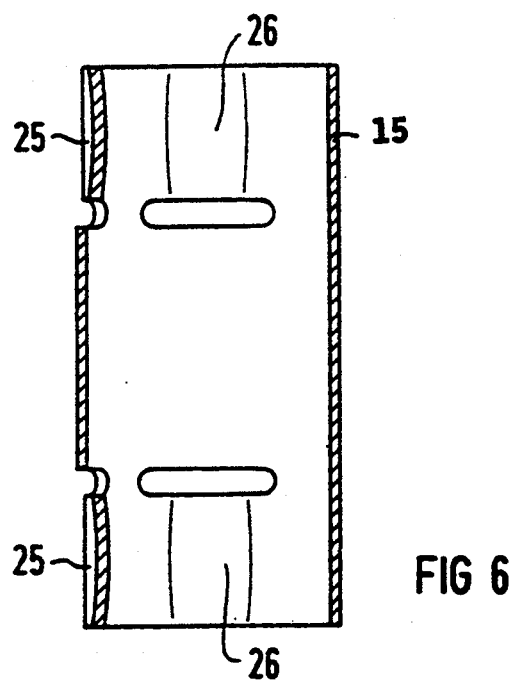
FIG. 6 is different sectional view, which are both taken through an inner rib shown in FIG. 4.

FIG. 4 also shows two bearing elements 25, 26 that are constructed as rigid knobs on the rib 15. The disposition of the bearing elements 25, 26 on the rib 15 is shown in FIGS. 5 and 6.

Figure 7:
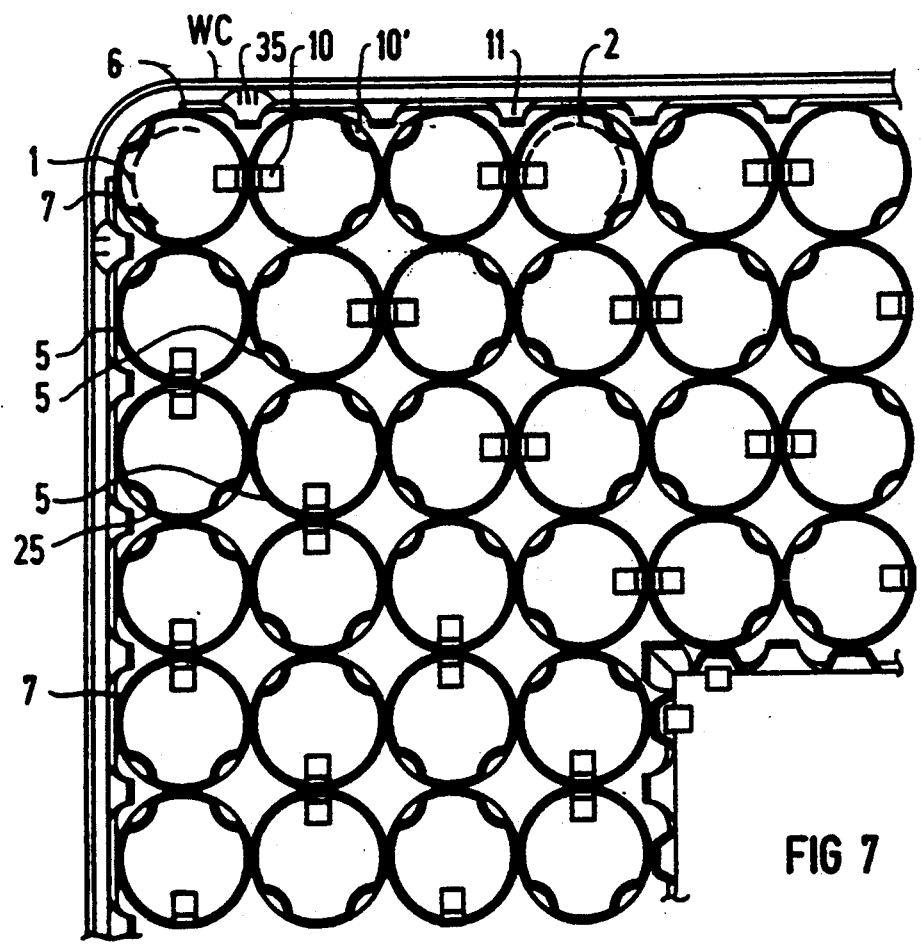
FIG. 7 is a fragmentary, cross-sectional view of a corner of the spacer of FIG. 1 (without fuel rods)
Figure 8:
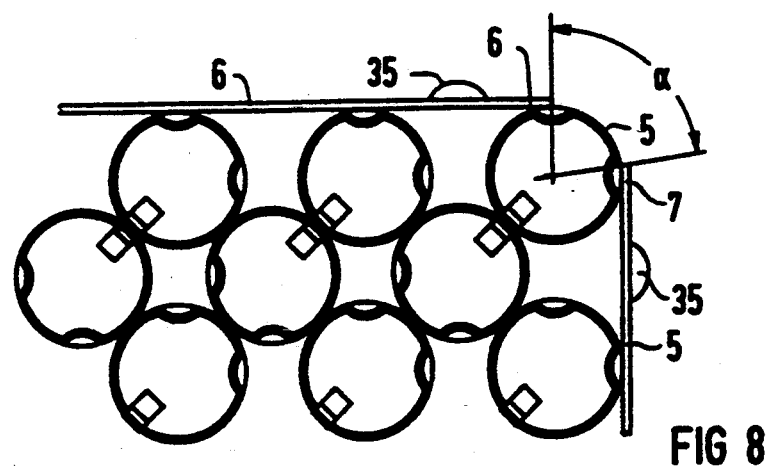
FIGS. 8 and 9 are fragmentary, cross-sectional views of corners of similar spacers with can-like inner ribs.
Figure 9:
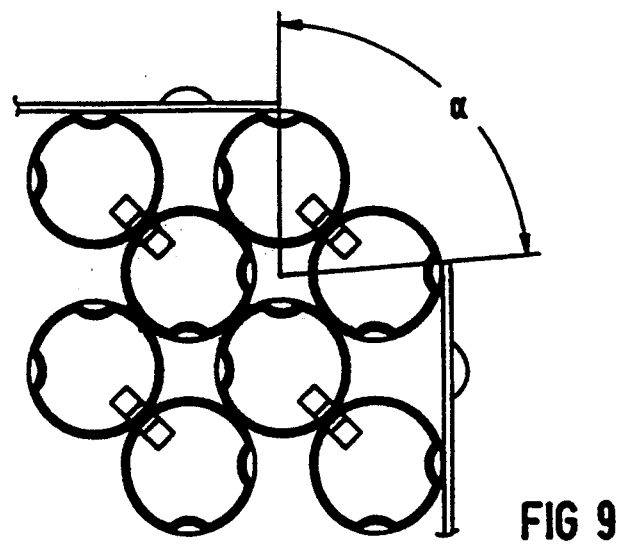

FIGS. 7 and 8 clearly show that in two different configurations of the fuel rods in a boiling water fuel assembly with a rectangular cross section, the outer peripheral ribs 6 and 7 are joined only by the inner ribs in the form of the cans 5, so that these ribs 6 and 7 form an outer frame around the spacer that has a gap with an opening angle $\alpha$ that is close to 90°.

An edge of the rib 15 resting on the spring end 20 (and naturally the corresponding edge of the rib 21 as well in the case of a double-sided spring) has a recess 24 formed therein that is engaged by the spring end 20. This prevents lateral shifting of the spring. An equivalent recess may be provided on both edges of the rib 15, as FIG. 5 shows.

Figure 10:
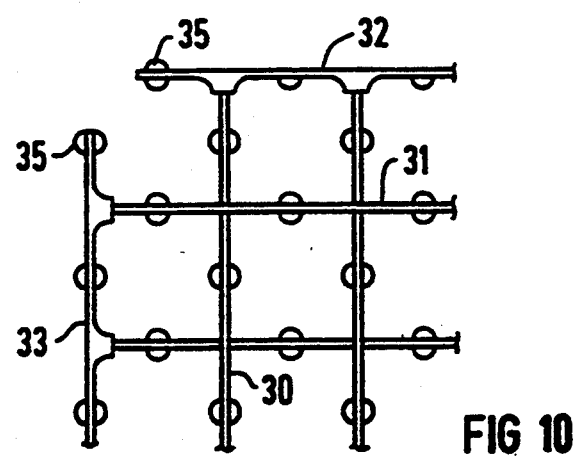
FIG. 10 is a fragmentary, cross-sectional view of an "open corner" of the spacer with square meshes or mesh openings.

While FIGS. 1–9 show spacers in which all of the inner ribs are constructed as cans and all of the fuel rods are seated in these cans, FIG. 10 shows an embodiment in which only the inner rods are seated in meshes formed by inner ribs 30, 31, while these inner ribs are fastened, for instance by welding, to outer ribs 32, 33, so that the meshes with the peripheral rods are each formed partly by inner ribs and partly by peripheral ribs. Once again, however, the peripheral ribs may be joined together only by inner ribs.

This is possible especially if knobs 35 are provided on the corners of these outer rods. The knobs fix the outer rods relative to a fuel assembly channel that rests on them.

Figure 11:
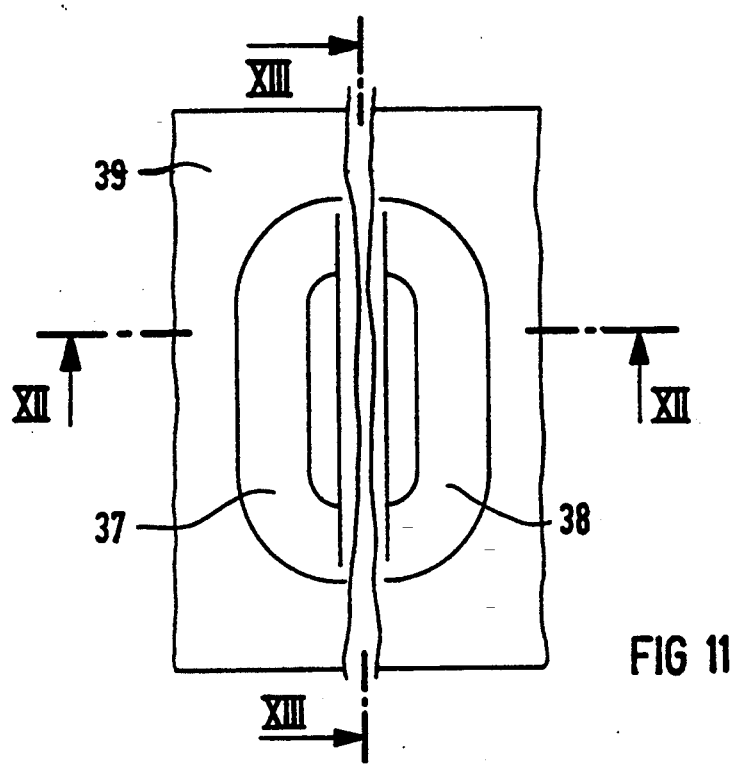
FIGS. 11–13 are respective fragmentary, front elevation, cross-sectional and longitudinal-sectional views of an outer peripheral rib with half-knobs for supporting against the fuel assembly channel, with FIGS. 12 and 13 being taken along the lines XII—XII and XIII—XIII, respectively, of FIG. 11, in the direction of the arrows.
Figure 12:
Figure 13:
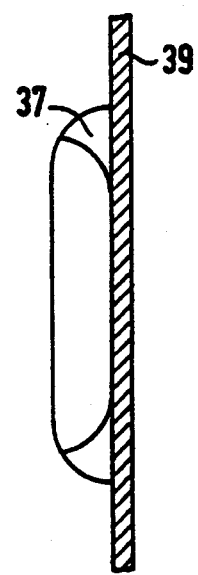

One such knob is shown in FIG. 11 as well as in the sectional views of FIGS. 12 and 13, which are taken along the lines XII—XII and XIII—XIII, and which include two halves 37, 38 of a toroidal bead that are shaped as mirror images of one another. The toroidal bead is formed onto an outer rib 39.

Figure 14:
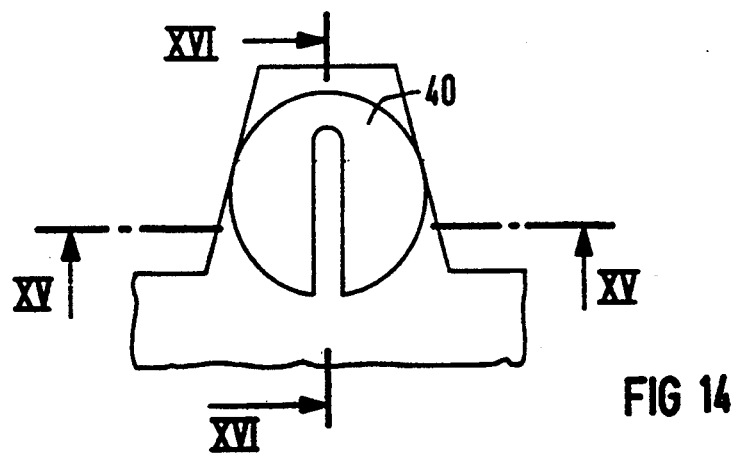
FIGS. 14–16 are views similar to FIGS. 11–13 of additional support knobs on tabs of the outer peripheral rib, with FIG. 15 being taken along a line XV—XV of FIG. 14, in the direction of the arrows.
Figure 15:
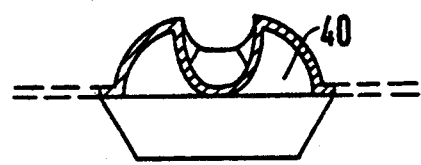
Figure 16:
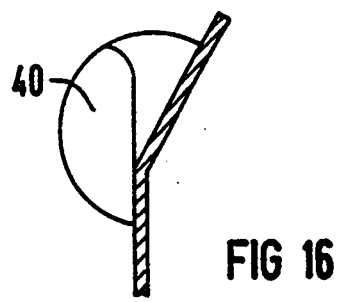

The springs or tabs 10 that were already mentioned in conjunction with FIG. 1 may also have small knobs 40 seen in FIGS. 14–16, which are located downstream of the knob halves in terms of the flow and stabilize the position of the spacer without substantially contributing to the flow resistance.

Figure 17:
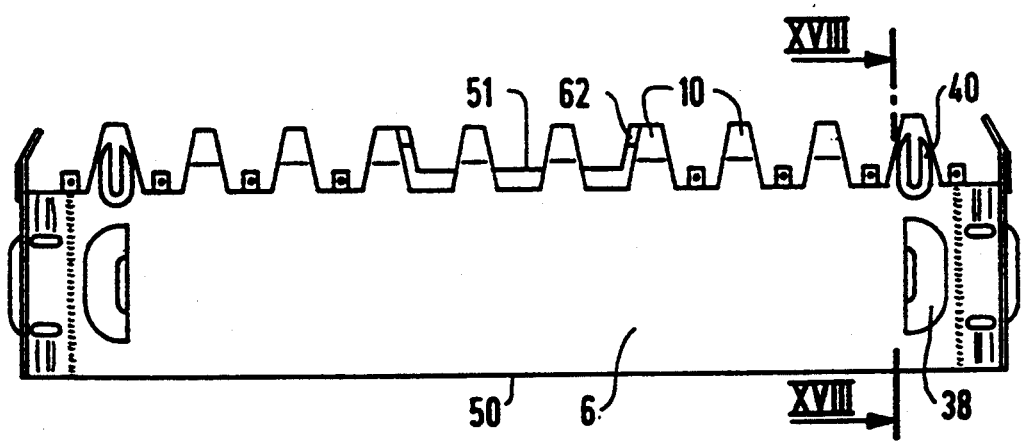
FIGS. 17 and 18 are respective front-elevation and fragmentary, longitudinal-sectional views of an outer peripheral rib, with FIG. 18 being taken along a line XVIII—XVIII of FIG. 17, in the direction of the arrows.
Figure 18:
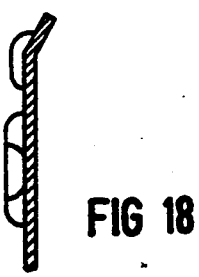

FIG. 17 shows that lower edges 50 of the outer peripheral ribs 6 and 7 cover corresponding lower edges of the inner peripheral ribs, because these edges are located practically in the same plane. The same is true for the upper edges of the tabs 10 and 11 at the inner and outer peripheral ribs.

Figure 19:
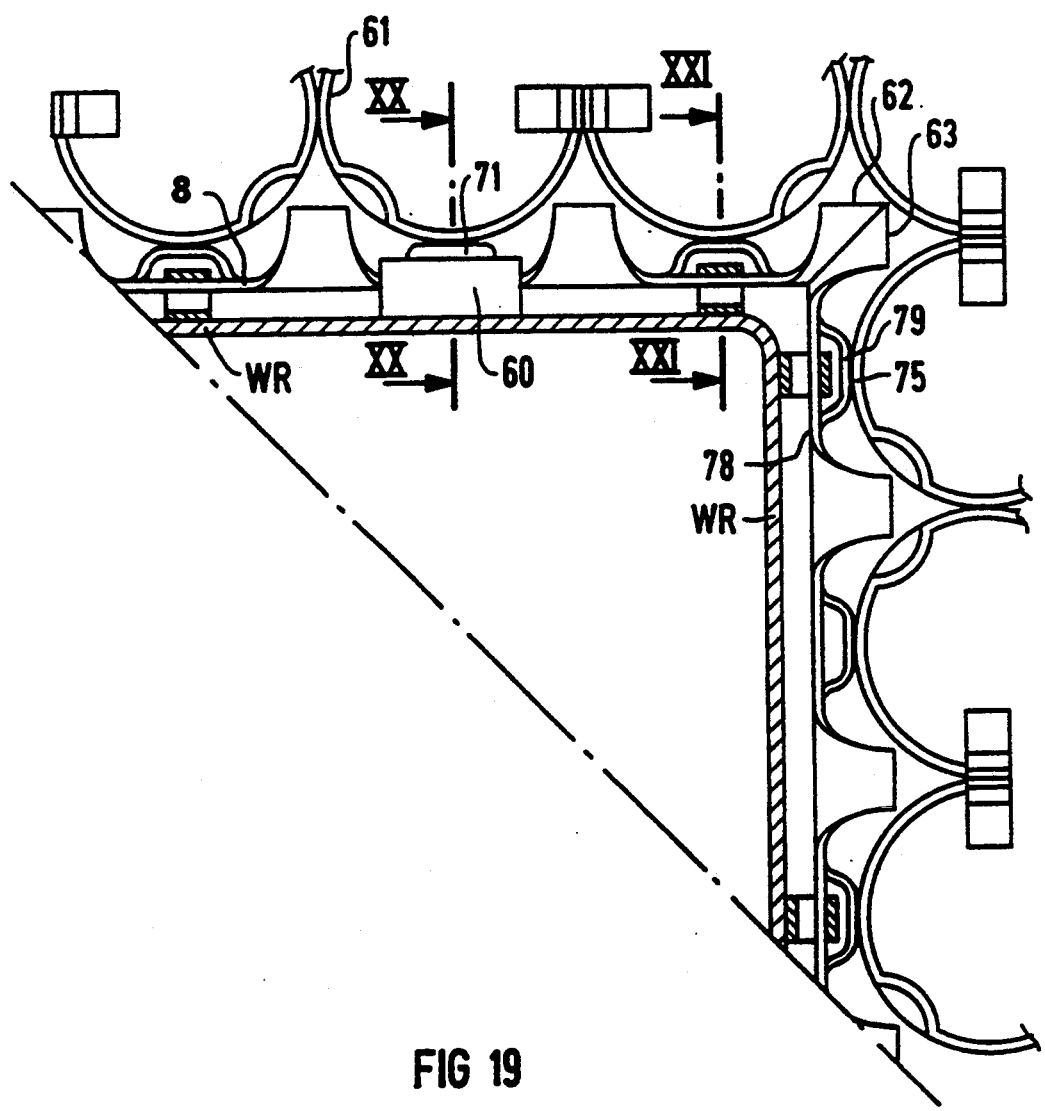
FIG. 19 is a fragmentary, cross-sectional view of half of a coolant pipe, with stops, spacer springs, adjacent inner peripheral ribs and inner ribs of the spacer.

However, between these tabs, the outer peripheral ribs 6 and 7 are lower than the inner peripheral ribs that have upper edges 51 which are therefore visible in FIG. 17. As compared with the base of the tabs 10 at the outer peripheral ribs, the base of the tabs 11 on the inner peripheral ribs is accordingly smaller, and correspondingly the edges located between the tabs of the inner peripheral ribs are wider. They accordingly form suitable stop surfaces, against which corresponding stops 60 that are welded to the coolant pipe WR and are seen in FIG. 19 can strike, without substantially hindering the coolant at the fuel rods seated there. It is therefore unnecessary to make the stops 60 protrude so far beyond the spacer that they would have to strike the inner ribs (such as a can 61 in FIG. 19) secured to the inner peripheral rib. Instead, the stops 60 do not touch any inner ribs. These stops are then advantageously each provided in the middle of a pipe wall, and two stops at diametrically opposed points on the channel are sufficient.

FIG. 17 also shows corner tabs 62 at the inner peripheral ribs, and FIG. 19 shows that two such corner tabs 62, 63 of abutting peripheral ribs are welded together. Although a corner tab of this kind only has a narrow connection to the respective inner peripheral rib because of the tight space available, nevertheless it is secured against being torn off by being welded to another corner tab. The overall result is that a stable edge is created at the inner peripheral ribs.

Figure 20:
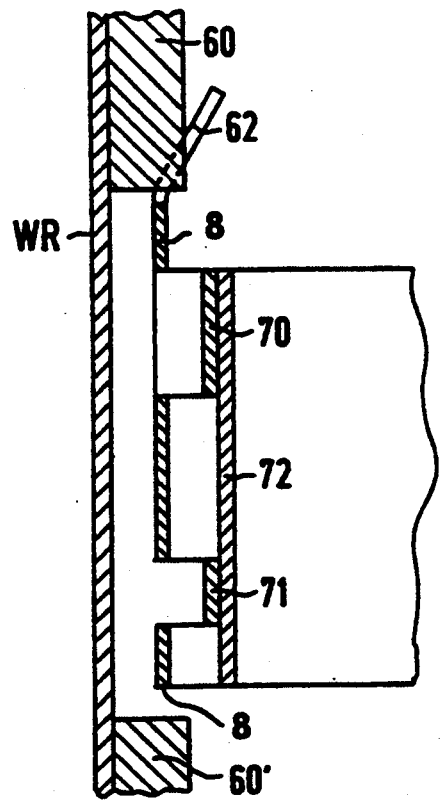

FIG. 20 shows that each inner peripheral rib 8, 9 of FIG. 19 has one contact part 70, 71 springing back toward an adjacent fuel rod, or in other words pointing away from the pipe wall. These parts are formed by upper and lower peripheral parts. A can-like inner rib 72 is fastened to this peripheral part, for instance by welding, forming a mesh that guides the fuel rod. FIG. 20 shows that an adequate stop surface area for the stop 60 fastened to the pipe wall WR is still assured in that case.

Figure 21:
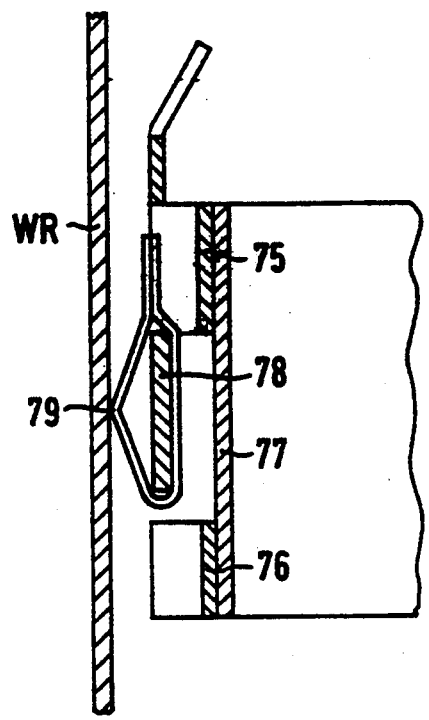
FIGS. 20 and 21 are two fragmentary, longitudinal-sectional views of portions of the elements shown in FIG. 19, with FIG. 21 being taken along a line XXI—XXI of FIG. 19, in the direction of the arrows.

As FIG. 21 shows, a middle part 78 may also be provided between corresponding upper and lower peripheral parts 75, 76, which are required for fastening a can-like inner rib 77. A spacer element supporting the peripheral rib against the wall of the pipe WC may be disposed on this middle part 78. A spring 79 is provided as the spacer element and is constructed similarly to the spring of FIG. 3, except that in this case no symmetrical embodiment is needed, nor is it necessary to have a stop that prevents over-stretching of the spring when a fuel rod is inserted.

The various provisions shown herein taking an especially advantageous spacer for a boiling water fuel assembly and can-like inner ribs as an example, are largely independent of one another. Accordingly, they need not be employed in combination. As a result, individual provisions according to the invention may also be applied to spacers having square meshes, for example, without departing from the scope of the invention. The embodiment of the spring which was described in detail at the outset may also be employed in fuel assemblies for pressurized water reactors.

We claim:

1. A fuel assembly, comprising:
   a cluster of mutually parallel fuel rods;
   a fuel assembly channel laterally surrounding said cluster of fuel rods and having a substantially rectangular cross section and flat channel walls;
   grid-like spacers having meshes formed therein each receiving a respective one of said fuel rods for guiding said fuel rods in a plurality of axial positions;
   at least one support spring laterally supporting each respective one of said fuel rods in said mesh guiding said fuel rod;
   each of said spacers having inner ribs being aligned parallel to said fuel rods and outer peripheral ribs opposite said channel walls, at least some of said inner ribs being fastened to said peripheral ribs, and said outer peripheral ribs being joined together substantially exclusively by said inner ribs.

2. The fuel assembly according to claim 1, wherein each of said inner ribs is a can forming one of said meshes surrounding and guiding one said fuel rods, and said cans for said fuel rods adjacent to said outer peripheral ribs are welded to said outer peripheral ribs.

3. The fuel assembly according to claim 1, for a boiling water nuclear reactor, including knobs supporting said outer peripheral ribs against said channel walls, said knobs having halves being mirror images of one another, said ribs having ends, each of said ribs resting on said channel wall, through one of said halves of said knob on one of said ends of said rib and through the other of said halves of said knob on the other of said ends of said rib.

4. A fuel assembly for a boiling water reactor, comprising:
   an approximately central coolant pipe;
   a cluster of mutually parallel fuel rods surrounding said coolant pipe and defining interstices therebetween;
   a channel laterally surrounding said cluster of fuel rods and having walls;
   a grid-like spacer having meshes for guiding said fuel rods, outer peripheral ribs opposite said walls of said channel, inner peripheral ribs substantially resting on said coolant pipe, and inner ribs joining said outer ribs to said inner peripheral ribs, said outer peripheral ribs and said inner peripheral ribs having upper edges;
   support springs laterally supporting said fuel rods in said meshes;
   rings of tabs disposed on said respective upper edges of said outer peripheral ribs and said inner peripheral ribs and bent into said interstices between the fuel rods adjacent said peripheral ribs, all of said tabs having upper edges disposed in an upper plane, all of said ribs having lower edges disposed in a lower plane, and said upper edges of said outer peripheral ribs being lower than said upper edges of said inner peripheral ribs between said tabs.

5. The fuel assembly according to claim 4, wherein said coolant pipe has stops engaging between said tabs of said inner peripheral ribs and coming to a stop against the upper edges of said inner peripheral ribs, substantially without touching said inner ribs.

6. The fuel assembly according to claim 5, wherein said stops are disposed only at two diametrically opposed locations on said coolant pipe.

7. The fuel assembly according to claim 4, wherein at least two of said tabs abut at locations at which they are laterally welded together.

8. The fuel assembly according to claim 4, wherein said coolant pipe has a wall, each of said inner peripheral ribs has an upper and a lower peripheral part being constructed as a contact part pointing away from the coolant pipe wall and springing back toward one of said fuel rods, and a can-like inner rib forming a mesh and being fastened on said peripheral parts.

9. The fuel assembly according to claim 4, wherein said coolant pipe has a wall, each of said inner peripheral ribs has upper and lower peripheral parts, a middle part between said upper and the lower peripheral parts, and a spacer element resting on said middle part and supporting said peripheral rib against the coolant pipe wall.

10. The fuel assembly according to claim 9, wherein said spacer element is a spacer spring resting on said middle part and being supported against the coolant pipe wall.

11. The fuel assembly according to claim 1, wherein said support springs are each held by an inner rib having a front side facing toward one of said fuel rods and include:

a) upper and lower bearing surfaces resting on a front side of the inner rib;
b) two flat legs each adjoining a respective one of said bearing surfaces;
c) a singly bent, resilient middle part facing toward said one fuel rod and joining said two flat legs together; and
d) spring ends each merging with a respective one of said two bearing surfaces, said spring ends being fastened to one another for completely encompassing the inner rib with said support spring;

wherein the front side of the inner rib has a protrusion facing toward said resilient middle part.

12. The fuel assembly according to claim 4, wherein said support springs are each held by an inner rib having a front side facing toward one of said fuel rods;

a) upper and lower bearing surfaces resting on a front side of the inner rib;
b) two flat legs each adjoining a respective one of said bearing surfaces;
c) a singly bent, resilient middle part facing toward said one fuel rod and joining said two flat legs together; and
d) spring ends each merging with a respective one of said two bearing surfaces, said spring ends being fastened to one another for completely encompasses the inner rib with said support spring;
e) wherein the front side of the inner rib has a protrusion facing toward said resilient middle part.

* * * * *